US00RE46888E

(19) United States
(12) Reissued Patent
Tilley et al.

(10) Patent Number: US RE46,888 E
(45) Date of Reissued Patent: Jun. 12, 2018

(54) INTEGRATED BELT AND PLENUM POWERED AIR PURIFYING RESPIRATOR

(71) Applicant: Avon Protection Systems, Inc., Cadillac, MI (US)

(72) Inventors: Greg A. Tilley, Monkton, MD (US); James Wilcox, Baltimore, MD (US)

(73) Assignee: Avon Protection Systems, Inc., Cadillac, MI (US)

(21) Appl. No.: 14/708,231

(22) Filed: May 9, 2015

Related U.S. Patent Documents

Reissue of:
(64) Patent No.: 8,607,784
Issued: Dec. 17, 2013
Appl. No.: 12/991,294
PCT Filed: May 8, 2009
PCT No.: PCT/US2009/043300
§ 371 (c)(1),
(2) Date: Nov. 5, 2010
PCT Pub. No.: WO2009/137770
PCT Pub. Date: Nov. 12, 2009

U.S. Applications:
(60) Provisional application No. 61/051,818, filed on May 9, 2008.

(51) Int. Cl.

| | |
|---|---|
| ***A62B 7/10*** | (2006.01) |
| ***A62B 17/00*** | (2006.01) |
| ***A62B 19/00*** | (2006.01) |
| ***A62B 23/02*** | (2006.01) |
| ***A45C 15/00*** | (2006.01) |

(Continued)

(52) U.S. Cl.
CPC ..... *A62B 7/10* (2013.01); *A62B 9/04* (2013.01); *A62B 18/006* (2013.01)

(58) Field of Classification Search
CPC ..... A62B 18/006; A62B 7/10; A62B 9/04
USPC ..... 128/201.25, 201.29, 205.12; 224/148.7, 224/576
See application file for complete search history.

(56) References Cited

U.S. PATENT DOCUMENTS

| | | | |
|---|---|---|---|
| 4,478,216 | A | 10/1984 | Dukowski |
| 4,899,740 | A | 2/1990 | Napolitano |

(Continued)

FOREIGN PATENT DOCUMENTS

| | | | |
|---|---|---|---|
| CA | 2427443 | A1 | 11/2004 |
| KR | 200150250 | Y1 | 7/1999 |

(Continued)

*Primary Examiner* — Cary Wehner
(74) *Attorney, Agent, or Firm* — McGarry Bair PC

(57) ABSTRACT

A powered air purifying respirator (PAPR) assembly and kit therefore has an elongated hollow belt body having open first and second ends and multiple inlet openings along its length for mounting one or more filter canisters, one or more filter canisters for mounting in the inlet openings for supplying purified air to the interior of the belt body, a motor and driven fan assembly having a fan inlet in communication with each filter canister through the hollow belt body and a fan outlet; and a power source operably mounted to the belt body and connected to the motor. The PAPR assembly forms a portion of a belt or bandolier to be worn around the user's waist, back, or other location, and at least the belt body can be made of a flexible rubber material, such as a Butyl and Silicone blend, or any other suitable material to conform the PAPR belt to the user's body.

34 Claims, 10 Drawing Sheets

(51) Int. Cl.

| | |
|---|---|
| ***A45F 3/18*** | (2006.01) |
| ***B44D 3/14*** | (2006.01) |
| ***A62B 9/04*** | (2006.01) |
| *A62B 18/00* | (2006.01) |

(56) References Cited

U.S. PATENT DOCUMENTS

| | | | | |
|---|---|---|---|---|
| 5,022,900 | A * | 6/1991 | Bar-Yona et al. | 96/142 |
| 5,181,506 | A | 1/1993 | Tardiff, Jr. et al. | |
| 5,265,592 | A | 11/1993 | Beaussant | |
| 5,394,870 | A | 3/1995 | Johansson | |
| 6,209,144 | B1 | 4/2001 | Carter | |
| 6,513,523 | B1 | 2/2003 | Izuchukwu | |
| 6,526,968 | B1 | 3/2003 | Izuchukwu et al. | |
| 6,575,165 | B1 * | 6/2003 | Cook et al. | 128/206.17 |
| 2003/0192536 | A1 * | 10/2003 | Odell et al. | 128/201.22 |
| 2005/0145251 | A1 | 7/2005 | Taylor et al. | |
| 2006/0191533 | A1 | 8/2006 | Brookman et al. | |
| 2007/0131228 | A1 | 6/2007 | Croll et al. | |
| 2007/0163588 | A1 | 7/2007 | Hebrank et al. | |

FOREIGN PATENT DOCUMENTS

| | | | |
|---|---|---|---|
| KR | 1020060113977 | A | 11/2006 |
| WO | 0256966 | A1 | 7/2002 |
| WO | 2006108042 | A1 | 10/2006 |
| WO | 2009/067583 | A2 | 5/2009 |

* cited by examiner

INTEGRATED BELT AND PLENUM POWERED AIR PURIFYING RESPIRATOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a National Phase application of International Application No. PCT/US2009/043300, filed May 8, 2009, which claims the benefit of U.S. Provisional Application No. 61/051,818, filed May 9, 2008, both of which are incorporated herein by reference in their entirety.

BACKGROUND OF THE INVENTION

1. Field of the Invention

This invention relates to powered air purifying respirators. In one of its aspects, the invention relates to a powered air purifying respirator that has an integrated plenum and belt. In another of its aspects, the invention relates to a powered air purifying respirator that has a powered air supply source that is adapted to be worn around the waist. In yet another of its aspects, the invention relates to a powered air purifying respirator component that is adapted to be removably mounted to a hose that is connected to a respirator mask. In yet another of its aspects, the invention relates to a powered air purifying respirator component that delivers a constant flow of purified air to a respirator mask in the event of partial filter clogging. In another of its aspects, the invention relates to a kit for a powered air purifying respirator that is adapted for multiple different conditions.

2. Description of the Related Art

Powered air-purifying respirators (PAPRs) continually supply positive air pressure to a respirator mask to maintain positive pressure in the respirator. PAPRs are generally used in military, industrial or hazardous environments to provide personal respiratory protection by preventing ambient air from entering the user's mask, helmet, or hood. Respiratory hazards can include particulate matter, harmful gases, or vapors, which are removed by passing ambient air through the PAPR. Typically, a PAPR includes a powered fan that forces ambient air through one or more filters for delivery to an inlet opening in the respirator mask, helmet or hood. The fan, filter, and power source may be mounted on a face mask or, in some cases, may be mounted on a belt or backpack and connected to the facemask through a hose and a fan. PAPRs that are worn on the user's waist are typically attached to a belt by threading the belt through loops or slots in the component housing, and the respiratory components are typically worn on the back portion of the belt.

International Patent Application No. WO 2006/108042 to Phifer et al. discloses a PAPR that includes an enclosure, defining a single contiguous enclosed interior, an inlet duct, including an inlet and a distribution portion, that guides ambient air to the interior of the enclosure, a plurality of filter canisters disposed within the interior of the enclosure, and a blower that forces air through the at least one inlet, into the interior of the enclosure and through the plurality of filter canisters to produce filtered air suitable for breathing. The main body of the PAPR is the PAPR housing, which encloses the motor, the blower and at least part of the controller. The PAPR housing provides the primary structure of the PAPR and includes one or more ports for the filter canisters. Each armored filter includes a filter canister and a filter cover. Together, the filter covers and manifolds form enclosures that protect the filter canisters from heat, flame, physical blows, etc. The PAPR can be carried by the users around their waist via a belt, or on their back or over their shoulder using a simple conventional shoulder strap or harness, or any other suitable apparatus.

United States Patent Application Publication No. 2006/0191533 to Brookman et al. discloses a combination SCBA system for providing bottled air and PAPR system for purifying ambient air for use by a user wherein the two systems are used alternatingly depending on the contaminated condition of the ambient air and the oxygen content of the ambient air. The blower motor and fan assembly is operatively connected to a plenum chamber assembly that has attached to it a plurality of filter elements. The impeller fan draws ambient air through the filters. The cleaned air is drawn by the fan into operative relationship with the face mask and thereby provides breathable air to the wearer. The system is worn on a conventional harness.

U.S. Pat. No. 4,478,216 to Dukowski discloses a portable breathing assist, including a two part external housing comprising a first half and a second half. The breathing assist further includes an internal scroll housing with a radial impeller within the scroll housing; the radial impeller is mounted so as to be rotatable by the electric motor shaft to which it is attached. An air manifold within the external housing defines a passageway for air from two openings to a central inlet into the internal scroll housing. The air passageway communicates with a plenum which communicates directly with a circular threaded opening adapted to receive a filter pad. The first housing half has brackets for threading a belt therethrough; the belt is said to secure the device around the waist of the user. The first housing half also contains a battery pack. The portable breathing assist is said to be used in conjunction with a face mask and hose.

SUMMARY OF THE INVENTION

According to the invention, a powered air purifying respirator (PAPR) assembly comprises an elongated hollow belt body having open opposite first and second ends and multiple inlet openings along its length for mounting filter canisters; a filter canister mounted in at least one of the inlet openings for supplying purified air to the interior of the belt body; a motor and driven fan assembly has a fan inlet in communication with the or each filter canister through the hollow belt body and a fan outlet; and a power source operably mounted to the belt body and connected to the motor.

In one embodiment, the powered air purifying respirator assembly further comprises a blower housing removably attached to an open end to the first end of the belt body and further having an outlet opening that is adapted to mount a hose for supplying filtered air to a user-wearable respiration protection device. The motor and driven fan assembly can be mounted within the blower housing, the fan inlet can be in communication with the or each filter canister through the open end of blower housing and the first end of the belt body, and the fan outlet can be in fluid communication with the blower housing outlet opening.

In another embodiment, the power source is mounted in a battery housing that is attached to the second end of the belt body and comprises a plurality of rechargeable batteries. Further, a hose can be removably mounted to the blower housing outlet opening for supplying filtered air to a user-wearable respiration protection device. Preferably, the hose has a swivel mounting through which it can be mounted to the blower housing outlet opening, whereby the belt can be worn in a right orientation or a left orientation by simply inverting the respirator belt from one orientation to the other.

In another embodiment, a self-contained PAPR module that includes the motor and driven fan assembly and the power source can be mounted in one of the inlet openings. The PAPR module can have an inlet opening in communication with each filter canister and an outlet opening that can supply filtered air to a user-wearable respiration protection device. A pair of end caps can be attached to the open ends of the first and second ends of the belt body to seal the same. In addition, the hose can be mounted to the outlet opening of the PAPR module for supplying filtered air to a user-wearable respiration protection device.

In one embodiment, the PAPR module can be removably mounted to the belt body for interchangeability of components mounted to the belt body. Further, the power source can be removably mounted to the belt body. Further, the filter canister or canisters can be removably mounted to the belt body.

In another embodiment, a relatively rigid spine can be mounted within the belt body and can extend along the length of the belt body, and the spine can have connectors at each end to connect the belt body to components that are mounted to the open first and second ends of the belt body. The spine can have a plurality of spaced fingers along the length thereof and the spaced fingers can be configured to prevent collapse of the belt body due to transverse compression thereof. The spine connectors can include a hook formed into each end of the spine and pins that extend through the hooks.

In a preferred embodiment, the belt body can be formed of a flexible elastomeric material and can be resiliently bendable and twistable to conform to a user's body. Further, the belt body can be formed with flat sections that are bounded by corrugated sections. Further, one inlet opening can be formed in each flat section. Still further, each of the inlet openings can be formed with connectors that are adapted for mounting filter modules. Preferably, the connectors in the inlet openings can be threaded or bayonet connections. In a preferred embodiment, there can be three inlet openings spaced along the length of the belt body.

In another embodiment, a plurality of hose retention elements can be mounted to the belt body for releasably mounting a respirator hose on the belt body.

In another embodiment, a belt can be mounted to the blower housing and to the battery housing to mount an assembled belt body, blower housing and battery housing to a user. In addition, the belt can be mounted to the end caps.

Still further according to the invention, a powered air purifying respirator kit comprises: an elongated hollow belt body having open opposite first and second ends and multiple inlet openings along its length for mounting filter canisters; at least one filter canister adapted to be mounted in at least one of the inlet openings for supplying purified air to the interior of the belt body; a motor and driven fan assembly adapted to be mounted to the elongated belt body and having a fan inlet for communication with at least one of the multiple inlet openings through the hollow belt body and a fan outlet; and a power source adapted to be operably mounted to the belt body and connected to the motor.

In one embodiment, a blower housing can be adapted to be removably attached through an open end to the first end of the belt body and an outlet opening can be adapted to mount a hose for supplying filtered air to a user-wearable respiration protection device The motor and driven fan assembly can be mounted within the blower housing wherein the fan inlet can be in communication with the open end of blower housing and the fan outlet can be in fluid communication with the blower housing outlet opening. Further, the power source can be mounted in a battery housing that is adapted to be attached to the second end of the belt body. A hose can be adapted to be removably mounted to the blower housing outlet opening for supplying filtered air to a user-wearable respiration protection device. The hose can have a swivel mounting through which it is mounted to the blower housing outlet opening, whereby the belt body can be worn in a right orientation or a left orientation by simply inverting the belt body from one orientation to the other. Further, a belt can be adapted to be mounted to the blower housing and to the battery housing can be provided to mount an assembled belt body, blower housing and battery housing to a user.

In a further embodiment, a self-contained PAPR module can include the motor and driven fan assembly, and the power source, and the PAPR module can be adapted to be mounted in one of the inlet openings wherein the fan inlet opening can be in fluid communication through the belt body with one or more of the filter modules that may be mounted in other of the inlet openings in the belt body and the PAPR module has an outlet opening for supplying purified air to a user. A pair of end caps can be adapted to be attached to the open ends of the first and second ends of the belt body to seal the same. The same belt can also be adapted to be mounted to end caps to mount an assembled belt body and end caps to a user.

In yet another embodiment, the respirator kit can include a variety of filter canisters to suit different conditions, including particulate matter, harmful gases, vapors, or CBRN (chemical, biological, radiological, and nuclear) exposure, wherein each of the filter canisters are adapted to be mounted in the inlet openings in the belt body.

In another embodiment, a controller can be electrically connected to the motor and the power source for controlling the power to the motor to maintain a constant flow of filtered air to a respirator user.

In use, ambient air is drawn through a air filter canister mounted to the belt body and into the inlet of the belt body by the fan. The fan pulls the filtered air into the blower housing or PAPR module and directs the pressurized air through the outlet of the blower housing or the outlet of the PAPR module and to the user wearable respiration protection device.

*In a further embodiment, a powered air purifying respirator (PAPR) assembly can include an elongated hollow body having multiple openings along a length of the elongated hollow body, a filter canister mounted in at least one of the openings for supplying purified air to an interior of the elongated hollow body, and a self-contained PAPR mounted one or more of the openings. The self-contained PAPR can have a motor and driven fan assembly having a fan inlet in communication with the filter canister or each of the filter canisters through the elongated hollow body and a fan outlet, and a power source operably connected to the motor and driven fan assembly to draw filtered air from the interior of the elongated hollow body to the fan outlet.*

DESCRIPTION OF EMBODIMENTS OF THE INVENTION

Figure 1:
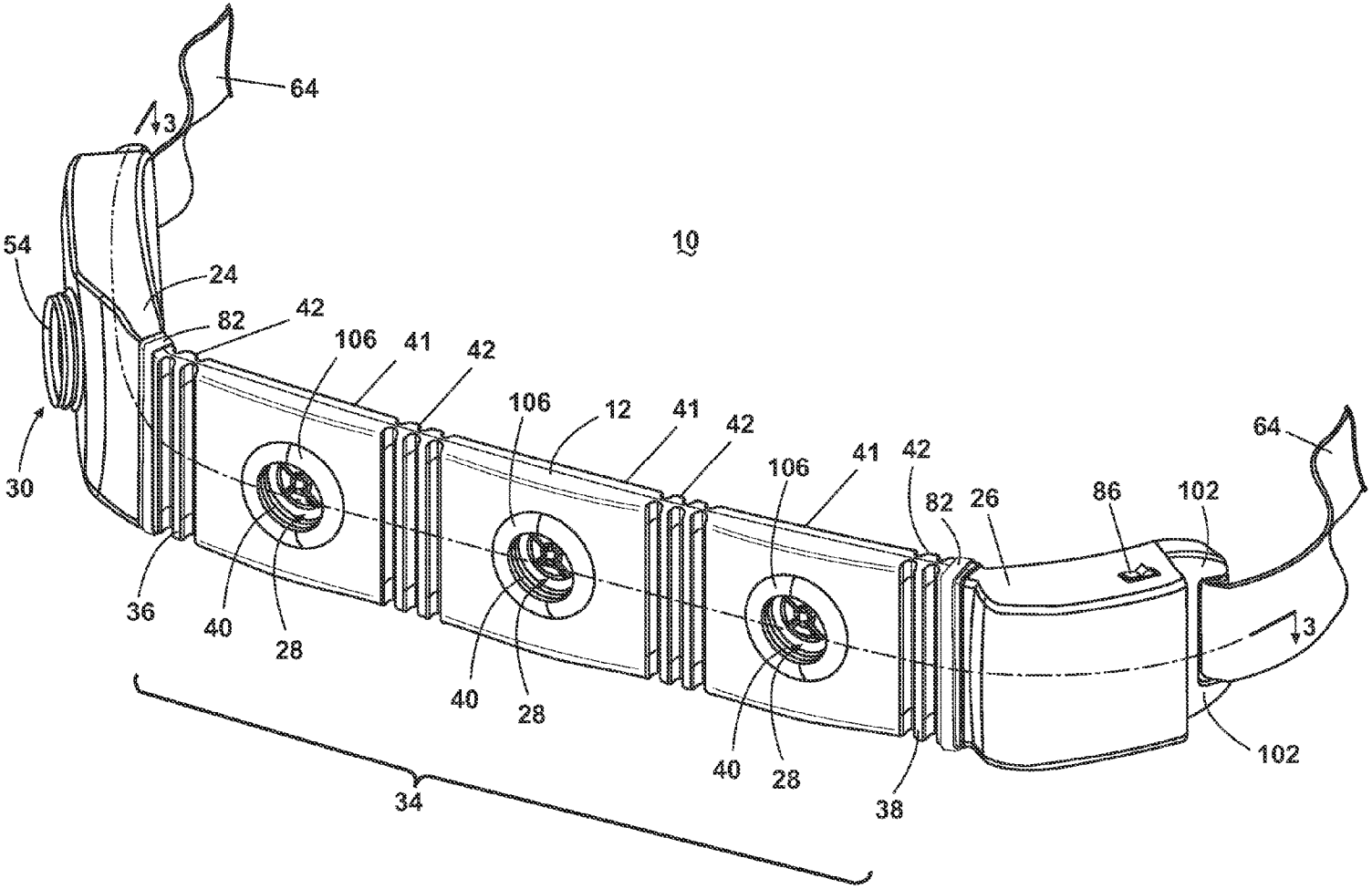
FIG. 1 is a perspective view of a PAPR belt according to a first embodiment of the invention.
Figure 2:
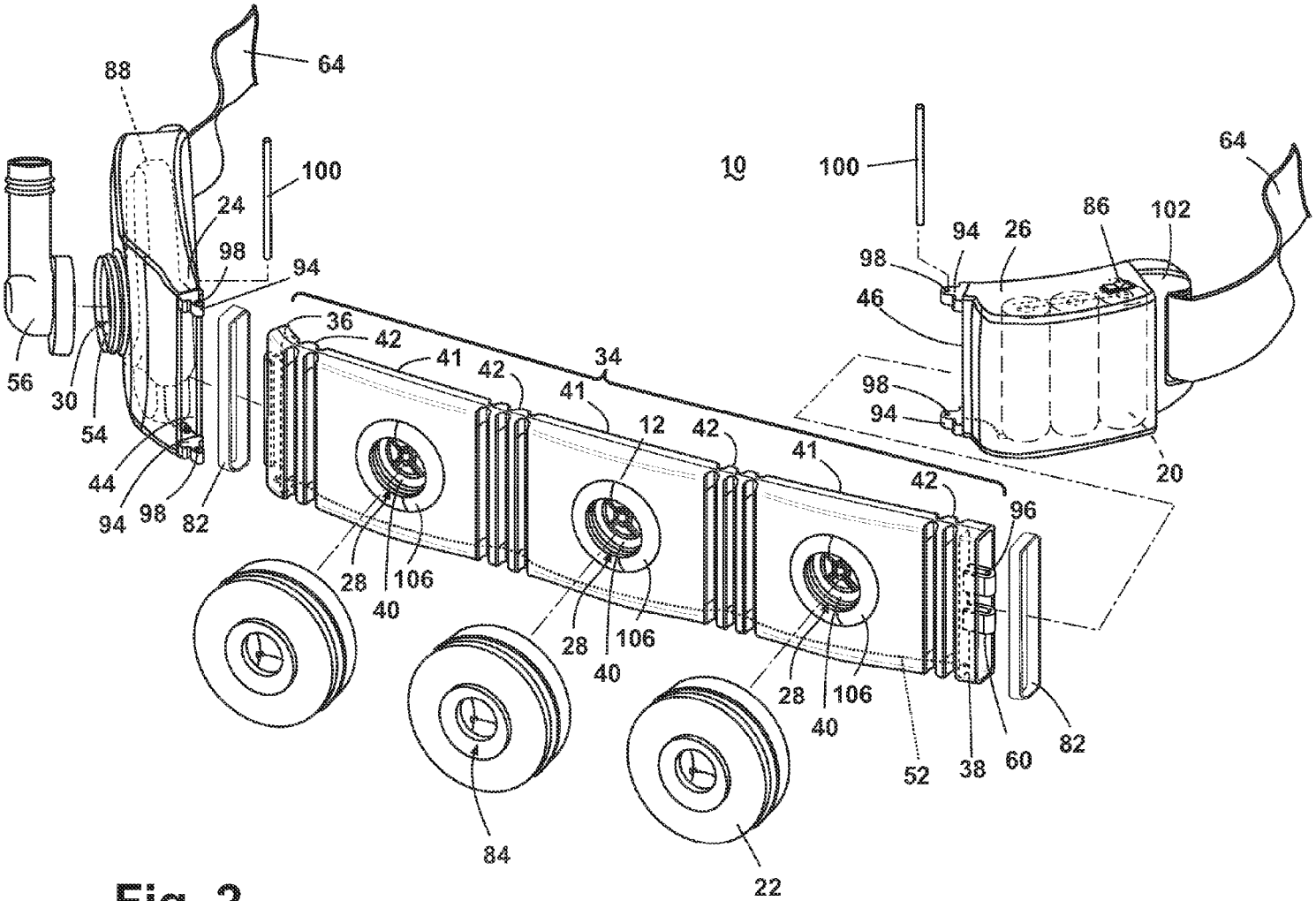
FIG. 2 is an exploded view of a PAPR belt of FIG. 1 in combination with a filter(s) and a hose.
Figure 3:
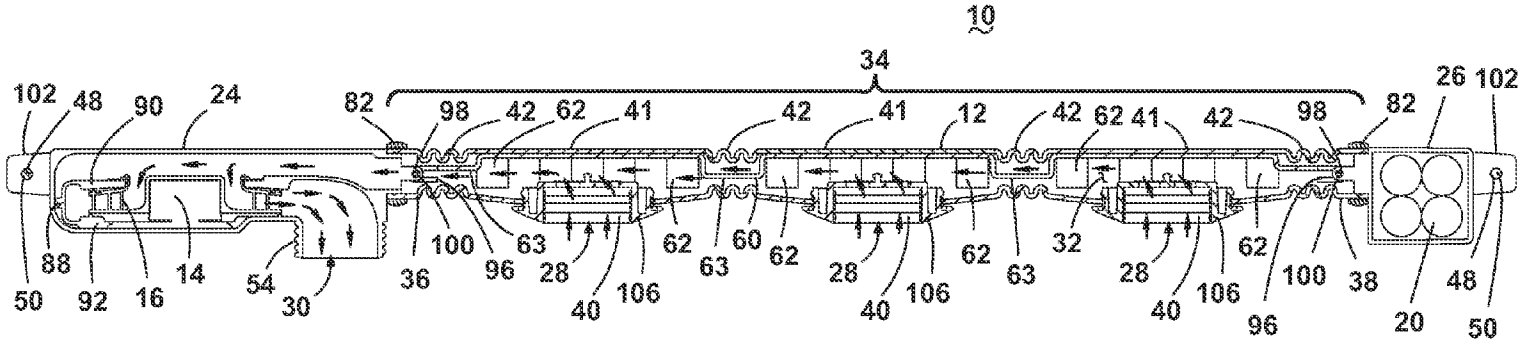
FIG. 3 is a cross-sectional view of the PAPR belt taken along line 3-3 of FIG. 1 and illustrating the air flow pattern through the PAPR belt.

Referring to FIGS. 1-3, a first embodiment of a powered air purifying respirator belt 10 according to the present invention is illustrated. The PAPR belt 10 generally comprises a belt body 12, a spine 60, a motor 14 and a driven fan 16 encased within a blower housing 24, and a power source 20 encased in a battery housing 26. The blower housing 24 and battery housing 26 are attached to opposite ends of the flexible belt body 12. The PAPR belt 10 has at least one inlet 28 that can be attached to an air filtering means, and an outlet 30 that can be attached to a user-wearable respiration protection device. In the illustrated embodiment, the PAPR belt 10 comprises three inlets 28. The PAPR belt 10 forms a portion of a belt or bandolier to be worn around the user's waist, back, or other location, and at least the belt body 12 can be made of a flexible rubber material, such as a Butyl and Silicone blend, or any other suitable material to allow the PAPR belt 10 to conform to the user's body.

The PAPR belt body 12 is hollow, and can have any cross-sectional configuration, but is preferably rectangular. The belt body 12 is comprised of a center segment 34, a battery end 38, and a blower end 36. The center segment 34 has a plurality of relatively flat sections 41 bounded by corrugated sections 42. The corrugated sections 42 provide longitudinal as well as lateral flexibility to the belt body so that it can be compressed longitudinally slightly and can bend laterally for conforming to the body of a user. Disposed in each of the three flat sections 41 is an opening in which a filter mount 106 is installed. The filter mount 106 includes an internally threaded filter sleeve 40 that defines the inlet 28 of the PAPR belt 10 and that can be used to couple an air filtering canister or other suitable filter to the PAPR belt 10. The belt body 12 acts as an air flow plenum that fluidly communicates the air inlets 28 with the air outlet 30.

The blower housing 24 comprises a blower housing open end 44, the outlet 30, and a pair of spaced integral attaching flanges 102 forming a belt recess in the closed end. The outlet 30 is defined by an externally threaded hose sleeve 54, which is advantageously used to couple the PAPR belt 10 to a mask facepiece or hood (not shown) via a hose 56. Two attaching flanges 94, each with a pin hole 98, are integrally formed in the blower housing open end 44 and the two attaching flanges 102, each with a pin hole 48, are formed in the closed end. The blower housing 24 can be removably attached to the belt body 12 at the blower housing open end 44 through the pin 100 and is sealed in air-tight fashion to the blower end 36 of the belt body 12. The blower housing 24 can be made of the same material as the belt body 12, or any other suitable material.

Figure 5:
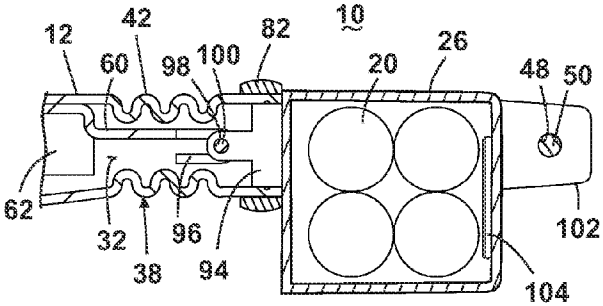
FIG. 5 is an enlarged view of a portion of the PAPR belt cross-section of FIG. 3, showing a battery housing end of the PAPR belt.

The battery housing 26 encases the power source 20 and comprises a battery housing open end 46 and a pair of integral attaching flanges 102, each with a pin hole 48, in the closed end. Two attaching flanges 94, each with a pin hole 98, are integrally formed in the battery housing open end 46 and the two attaching flanges 102, each with a pin hole 48, are formed in the closed end (FIG. 5). The battery housing 26 can be removably attached to the opposite end of the belt body 12 through the pin 100. At the battery housing open end 46, the battery housing 26 is sealed in air-tight fashion to the battery end 38 of the belt body 12. The battery housing 26 can be made of the same material as the belt body 12, or any other suitable material.

Both the blower housing 24 and the battery housing 26 have a pair of pin holes 98 located in the opposing short walls, or width, of the open ends 44, 46. The pin holes 98 are utilized in pairs and are spaced from and co-axial with each other. The pin holes 98 retain a pin 100, which is positioned between the holes 98. The pins 100 are utilized to removably retain the ends of a spine 60, to be described below, to the blower housing 24 and battery housing 26.

The pin holes 48 are utilized in pairs and are spaced from and co-axial with each other. The purpose of the pin holes 48 is to retain a pin 50, which is positioned between the holes 48. Each pin 50 provides a structure in the belt recess for which to attach a belt strap 64, to be described below.

A band 82 is located over the joint where the blower housing 24 and belt body 12 meet. A second band 82 is located over the joint where the battery housing 26 and belt body 12 meet. The bands 82 are positioned on the outer surface of the belt body 12 and compress the flexible rubber of the belt body 12 against the housings 24, 26 to ensure an air-tight seal is maintained between the components. The bands 82 can be made of any suitable material and preferably can be slid over the joint once the housings 24, 26 are in place. Alternatively, the band 82 can be a conventional type of band clamp.

Together, the belt body 12, battery housing 26, and blower housing 24 form an enclosed space to create a sealed breathing zone 32 that is in fluid communication with the inlet 28 and the outlet 30. Thus, only air which has passed through an air filter canister attached to the inlet 28 can pass to a respirator through the outlet 30.

Figure 4:
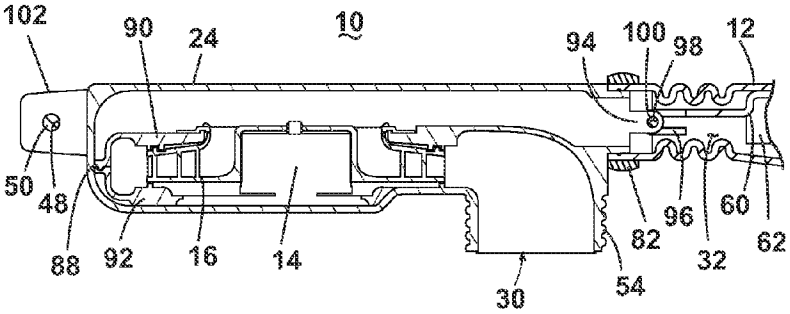
FIG. 4 is an enlarged view of a portion of the PAPR belt cross-section of FIG. 3, showing a blower housing end of the PAPR belt.

Referring to FIG. 4, enclosed in the blower housing 24 is an inner housing 88, which encases the motor 14 and centrifugal fan 16. The inner housing 88 is comprised of two halves, an inner housing upper 90 and an inner housing lower 92, which are fixed together by any suitable means.

The centrifugal fan 16 and motor 14 are co-axial and preferably the centrifugal fan 16 is driven by direct connection via a press fit to an outer rotor brushless motor 14. The inner housing 88 encircles the centrifugal fan 16 and motor 14 and is located between the fan 16 and the blower housing 24. The centrifugal fan 16 draws air from the inlet 28, through the belt body 12, into the blower housing 24, down into the inner housing 88, and propels it radially. The inner housing 88 then directs the pressurized air toward the outlet 30.

Referring to FIG. 5, enclosed within the battery housing 26 is a controller 104 and the power source 20, which is typically comprised of one or more batteries 20, preferably rechargeable batteries. The battery housing 26 is removable to allow the user to replace or recharge the batteries 20 upon their discharge. The power source can optionally be a removable battery pack that fits within the battery housing 26. Dependent on the chosen batteries 20 or battery pack, the power source 20 can be configured to provide power to the motor 14 for up to twelve hours of continuous run time.

The battery housing 26 also includes an integral power switch 86 (FIG. 2), which is located on the exterior of the battery housing 26. The power switch 86 is toggled between open and closed positions to control the power supplied by the batteries 20 to the motor 14. The battery housing 26 is only one contemplated location for the power switch 86; other locations are possible, including remote locations.

The controller 104 is located within the battery housing 26 and monitors the speed of the centrifugal fan 16 (FIG. 4) and controls the motor 14 (FIG. 4) speed in response to the monitored fan 16 speed to ensure a substantially constant flow rate through the PAPR belt 10. Control of the motor 14 by this method maintains a minimum flow rate between the inlet 28 (FIG. 1) and outlet 30 (FIG. 1) openings, even when an air filter in line with the inlet 28 is partially clogged. The controller 104 is connected to a speed sensor (not shown) that senses the rotational speed of the motor 14, compares the sensed speed to a predetermined speed set in the controller 104 and adjusts the power to the motor 14 so that the sensed speed matches the predetermined. To this end, the controller 104 has a power supply circuit that is connected to the batteries 20 and is also connected to the motor 14 through a cable 52 to control the current supplied to the motor 14. The power switch 86 toggles between open and closed positions to control the power supplied by the batteries 20 to the controller 104.

Referring now to FIG. 2, the power source 20 provides power to the motor 14 (FIG. 4) via the cable 52. The cable 52 electrically connects the power source 20 and motor 14, and extends through the hollow interior of the belt body 12 from the battery housing 26 to the blower housing 24. Alternatively, the cable 52 can be molded into the material of the belt body 12.

Figure 6:
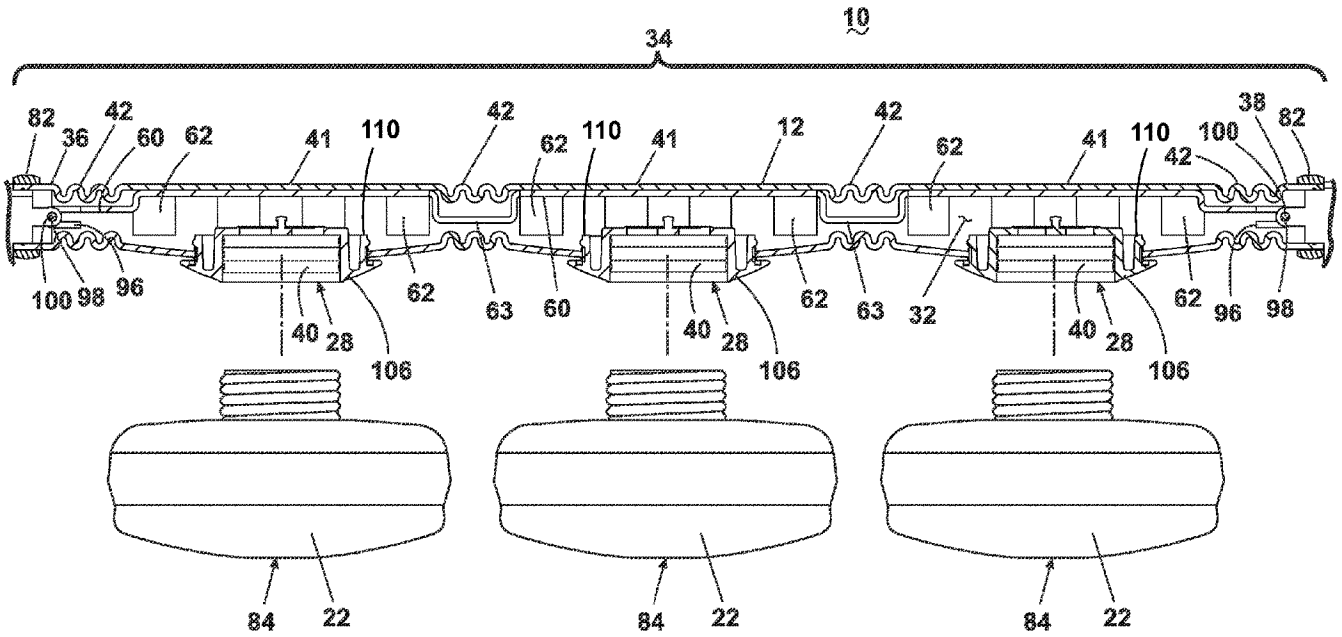
FIG. 6 is an enlarged view of a portion of the PAPR belt cross-section of FIG. 3, showing the center section of the belt body.
Figure 6A:
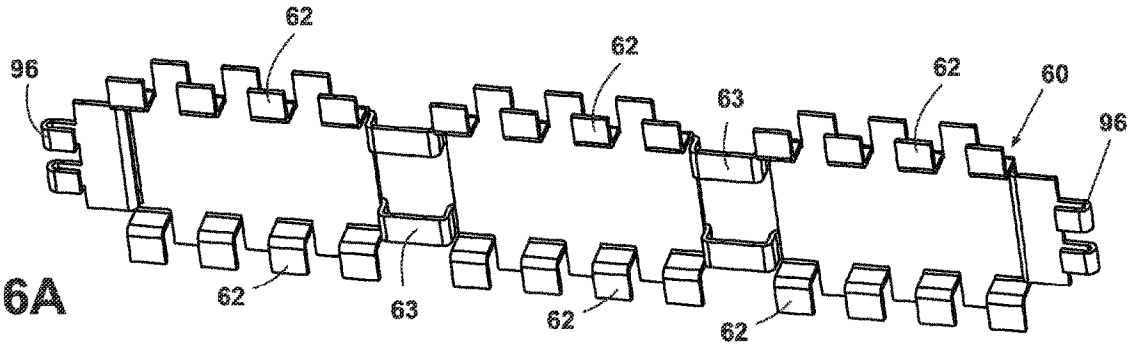
FIG. 6A is a perspective view of the spine that is partially shown in FIGS. 3 and 6.

Referring to FIGS. 6 and 6A, the spine 60 is located interior to, and along the length of, the belt body 12. The spine 60 is made of a somewhat rigid material, preferably a plastic or metal, and has a planar configuration with a number of spaced fingers 62 that protrude outwardly from the surface of the spine 60 with upturned and downturned ends and in registry with the flat portions 41 or the belt body 12. The spine also has a number of stepped bands 63 that are in registry with the corrugations 42. The spine 60 also has a pair of hooks 96 formed into each end, by which the spine 60 is linked to the blower housing 24 and battery housing 26. The hooks 60 are fastened over the pins 100 in the blower housing open end 44 and battery housing open end 46. The spine 60 is slightly shorter that the length of the belt body 12 so that the belt body must be compressed longitudinally slightly to fasten the hooks 60 over the pins 100, thereby compressing the blower housing open end 44 and the battery housing open end 46 tightly against the open ends of the belt body 12 and thereby seal the blower housing open end 44 and the battery housing open end 46 to the open ends of the belt body 12. The corrugations 42 are longitudinally compressed slightly during this fastening process. The spine 60 extends generally along the inside rear wall of the belt body 12 and is bent forwardly toward the front wall into the fingers 62 and into the stepped bands 63 at the corrugations 42 to prevent transverse compression of the belt body 12. Yet the spine 60 is resilient enough to bend concavely toward the top of the page when the belt body 12 is bent in one direction around the waist of the user while, due to the geometry of the spline, limits bending in the opposite direction. This spine reduces the possibility of accidental transverse collapse of the belt body 12 at the corrugations 42 and at the flat sections 41 if, for example, a user leans up against a wall or the belt is bent too severely. The spine 60 is configured to prevent complete transverse collapse of the belt body 12 and thus prevent restriction of airflow through the belt body 12 due to transverse pressure on a segment of the flexible belt body 12. In addition, the spine 60 also prevents longitudinal stretching of the flexible belt body 12 after installation of the blower housing 24 and the battery housing 26.

Referring again to FIG. 1, the PAPR belt 10 is retained on the user's waist, or other body location, by means of two attached belt straps 64. The belt straps 64 are attached to the pins 50, located in the belt recesses of the battery housing 26 and blower housing 24. The free ends of the belt straps 64 can be connected together by means of a conventional snap, buckle, or any other suitable attachment method.

Referring to FIG. 6, the PAPR belt 10 center segment 34 has at least one filter mount 106 installed in the opening (not shown) in the belt body 12. The filter mount 106 is cylindrical with a threaded interior surface that defines the threaded filter sleeve 40. The filter mount 106 is retained to the belt body 12 by means of a circular clamping ring 110, which snaps to the filter mount 106 and compresses the belt body 12 between the filter mount 106 and the clamping ring 110. Filter mounts of this type can be found on Avon Protection Systems' respirator masks.

The PAPR belt 10 can be coupled to an air filtering means, such as a canister filter 22. The attachment is made by threading the externally threaded canister filter 22 to the internally threaded filter sleeve 40 of the filter mount 106 at the inlet 28 of the PAPR belt 10. The canister filter 22 typically will include filtration beds for filtering particulate material and/or gaseous material and can be selected comprising various filtering materials according to the user's intended environment. Suitable filter beds are disclosed in the U.S. Pat. No. 7,213,595, which is incorporated herein by reference. The PAPR belt 10 can be selectively configured to couple with both traditional and conformal canister filters, one type of which is disclosed in U.S. Patent Application Publication No. US 2005/0161911, filed Apr. 26, 2002. The PAPR belt 10 can be configured to couple with a filter canister having a standard 40 mm thread, or other standard threads.

Figure 7:
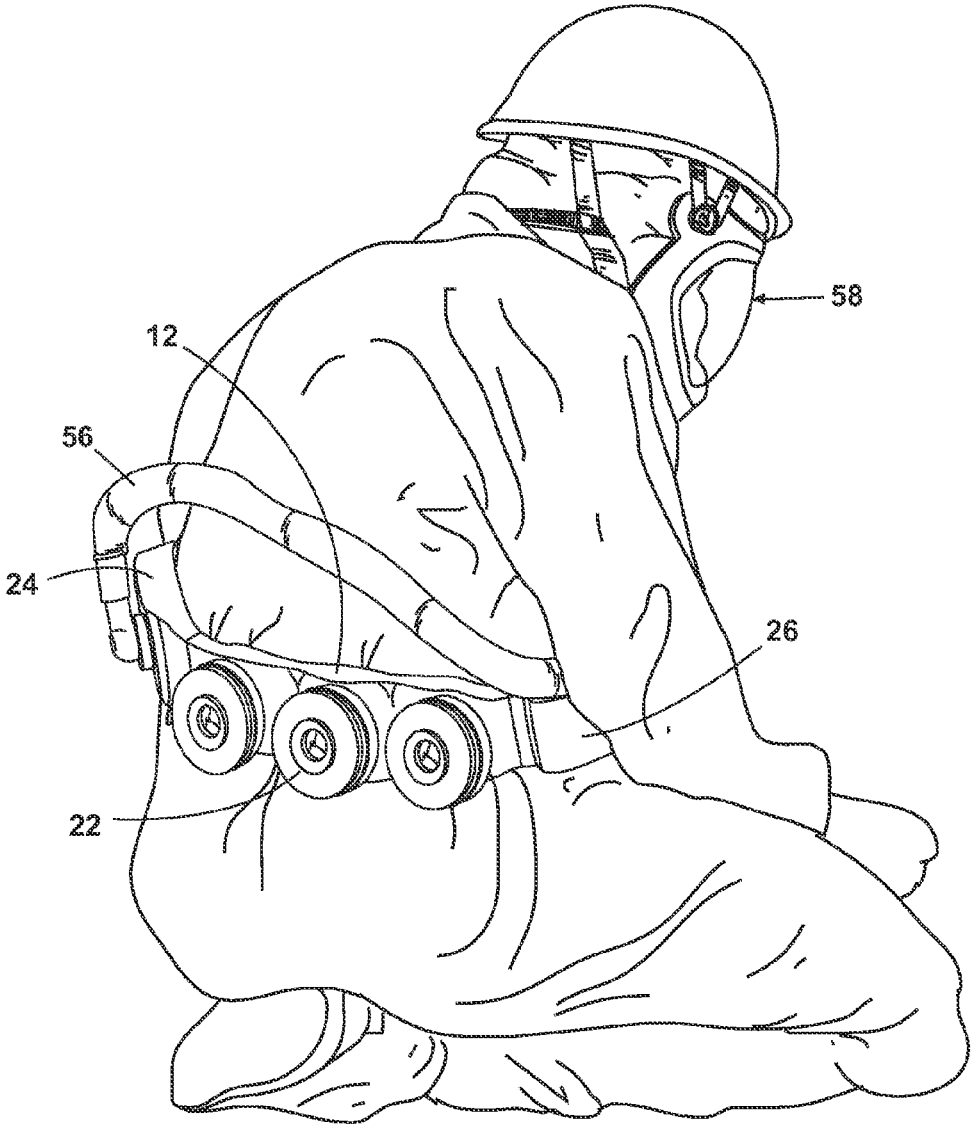
FIG. 7 is a perspective view of the PAPR belt of FIG. 1 illustrating a belt mounted user configuration.

In FIG. 7, the PAPR belt 10 is shown coupled to an air filter(s) and worn on the waist of a user for use with an air hose 56 between the PAPR belt 10 and a mask facepiece 58; however, the PAPR belt 10 can also be worn across the back or chest as a bandolier, or any other body location of a user. The PAPR belt 10 can be used in combination with a conventional swivel hose 56 that rotates near the connection to the outlet 30. This pivotal mounting of the hose 56 mounts the hose for rotational movement with respect to the PAPR belt 10 so that the hose 56 can be positioned in a variety of positions, dependent on how the PAPR belt 10 is being worn. A single PAPR belt 10 can be used by both right-handed and left-handed users. The battery housing 26 and power switch 86 can be located on the right side of the user's back, as shown in FIG. 7, for right-handed use, or rotated 180° for left-handed use, locating the battery housing 26 and power switch 86 on the left side of the user's back. The hose 56 is rotated 180° about its swivel mounting when inverting the PAPR belt 10 to change from right-handed to left-handed operation. In a similar fashion, the PAPR belt 10 can be worn in various positions across the user's torso, from shoulder to hip in a bandolier style. The PAPR belt 10 can also advantageously be attached to an SCBA tank (not shown). Further, the PAPR belt 10 can be located remotely from the user's body and used via the hose 56.

Referring to FIG. 3, an air flow path of the PAPR belt 10 is illustrated. As described above, power to the PAPR belt 10 can be turned on and off by means of the power switch 86 (FIG. 1). When powered on, the PAPR belt 10 draws ambient air through an attached air filter 22 and into the inlet 28 of the belt body 12 by the centrifugal fan 16. The centrifugal fan 16 pulls the filtered air into the blower housing 24, down into the inner housing 88, and then propels it radially. The inner housing 88 directs the pressurized air toward the outlet 30 of the PAPR belt 10 and to the user wearable respiration protection device.

Figure 8:
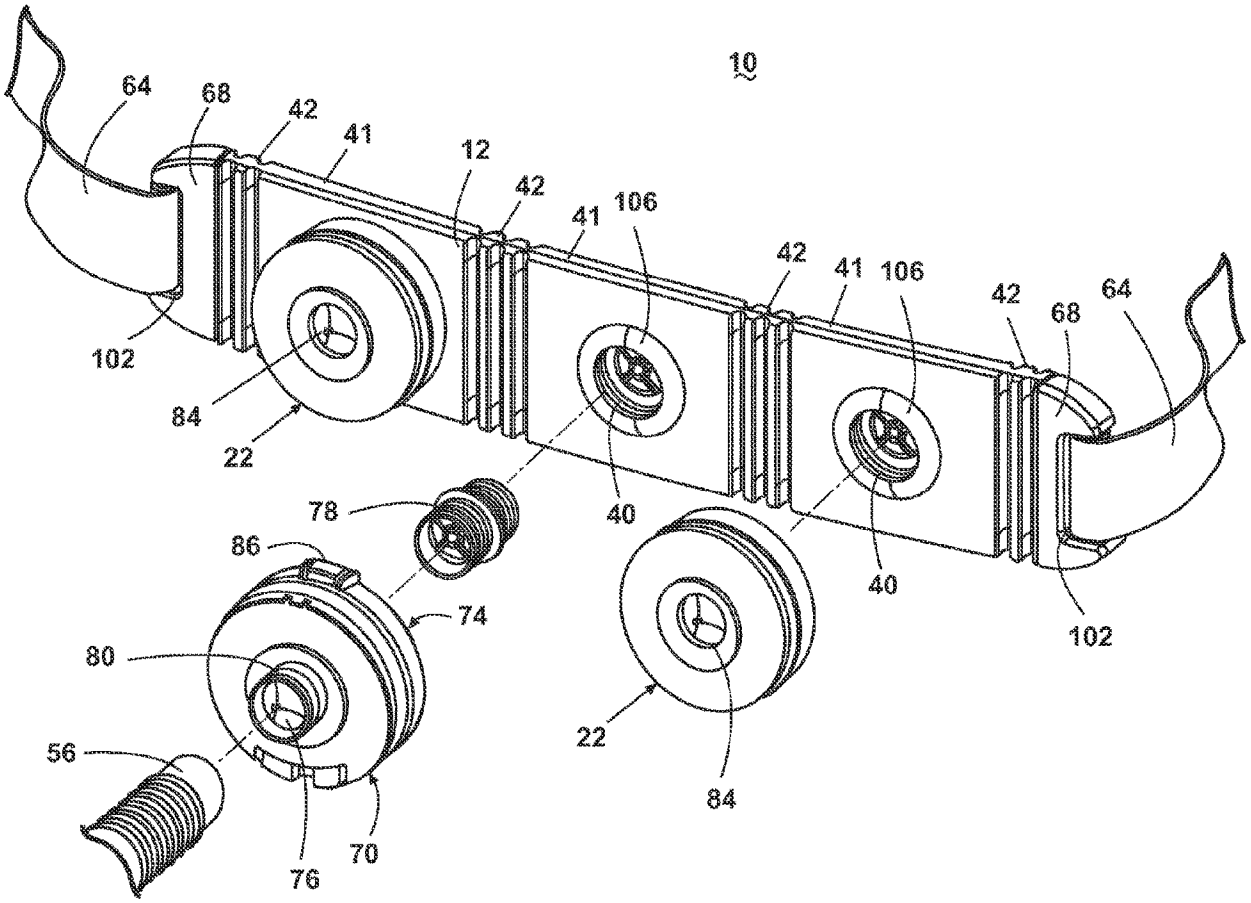
FIG. 8 is an exploded perspective view of a PAPR belt according to a second embodiment of the invention.

Referring to FIG. 8, a second embodiment of the PAPR belt 10 according to the invention is illustrated, where similar elements from the first embodiment are labeled with the same reference numerals. In this embodiment, the PAPR belt 10 includes the belt body 12, the spine 60, two blank end caps 68, a threaded adapter 78, and is used in conjunction with a self-contained PAPR module 70. The end caps 68 have a set of pin holes 98 (not shown) and a pin 100 (not shown) and can be removably attached to the spine 60 (FIGS. 6, 6A) in the same fashion as the battery housing 26 and the blower housing 24 of the first embodiment. A belt strap 64 is also attached to the pin 50 (not shown), which is retained by a set of pin holes 48 (not shown) located in the belt recess in each of the end caps 68, in the same fashion as the battery housing 26 and the blower housing 24 of the first embodiment. The belt straps 64 retain the PAPR belt 10 to the user's body in the same fashion as described above.

The self-contained PAPR module 70 generally comprises a motor, fan, and power source (not shown) all located within a single housing 74. The PAPR module 70 has an inlet [74 ] (not shown) that is in fluid communication with the belt body 12 through the threaded adapter 78 and an outlet 76 that is in fluid communication with the mask facepiece 58 (FIG. 7) through a hose 56. Attachment of the PAPR module 70 to the belt body 12 can be made by threading the externally threaded adapter 78 to the internally threaded inlet 74 of the PAPR module 70 and threading the opposite end of the adapter 78 to the internally threaded filter sleeve 40 at belt body 12 inlet 28. The internally threaded hose 56 is attached to the externally threaded sleeve 80 at the PAPR module 70 outlet 76 and the other end extends to a user's mask facepiece 58 or hood. At least one filter canister 22 having a filter inlet 84 can be attached to the belt body 12 by threading the externally threaded filter canister 22 to an internally threaded filter sleeve 40 at the inlet 28 of the belt body 12, as described above. A full description of the PAPR module 70 is disclosed in Application No. PCT/US2008/084158 published on or about 20 May 2009 and entitled "MODULAR POWERED AIR PURIFYING RESPIRATOR," which is incorporated herein by reference in its entirety.

Figure 9:
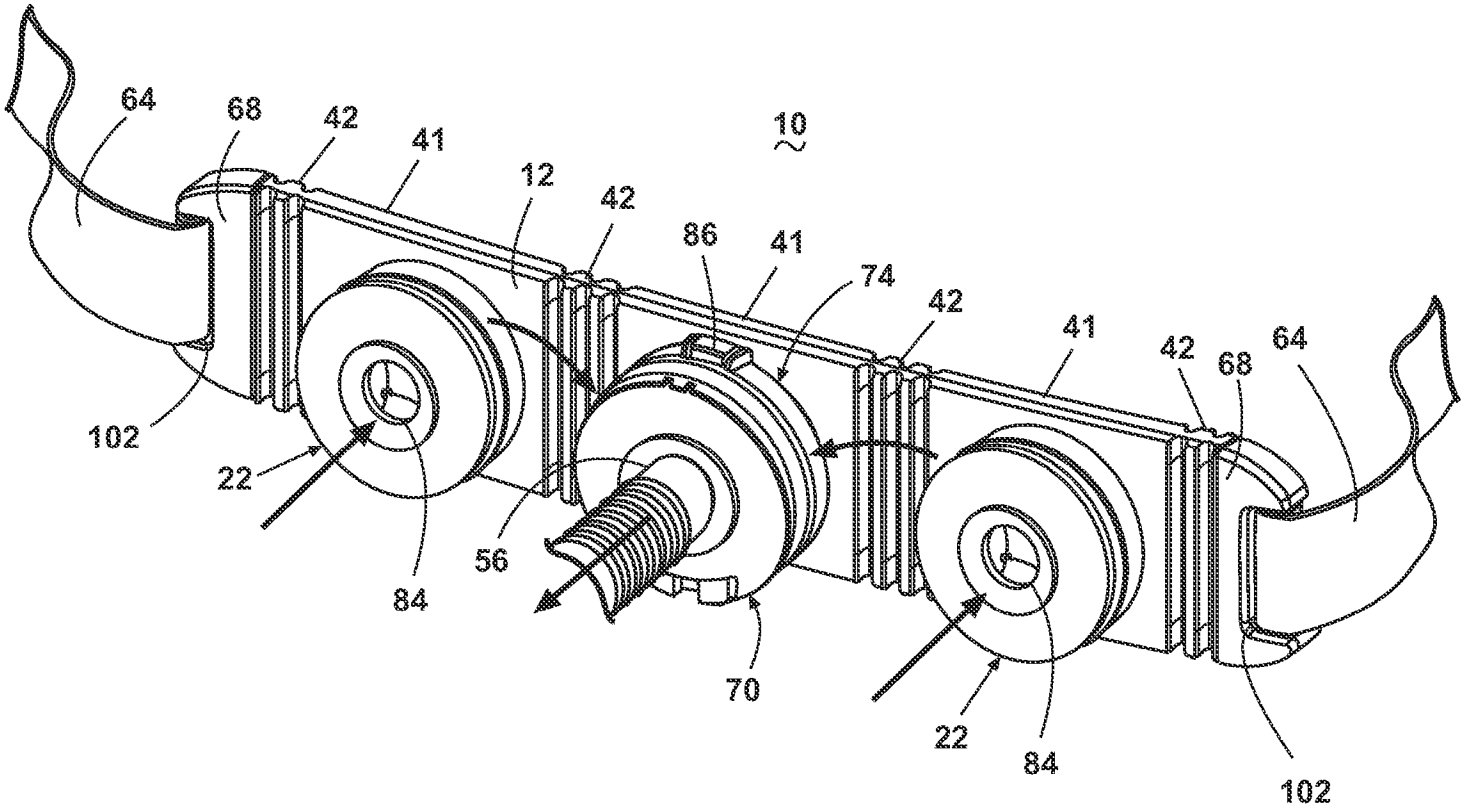
FIG. 9 is an assembled perspective view of the PAPR belt illustrated in FIG. 8 and illustrating an air flow path.

Referring to FIG. 9, in use, unfiltered ambient air is drawn by the centrifugal fan (not shown) of the PAPR module 70 through the inlets 84 of the canister filters 22 and into the belt body 12. The filtered air passes through the belt body 12 and into the PAPR module 70. Within the PAPR module 70, the centrifugal fan propels the air radially, a scroll (not shown) spirally directs the pressurized air toward the outlet 76, and finally the air is passed through the PAPR module 70 to the hose 56 and on to the user's mask facepiece 58 (FIG. 7) or hood.

Figure 10:
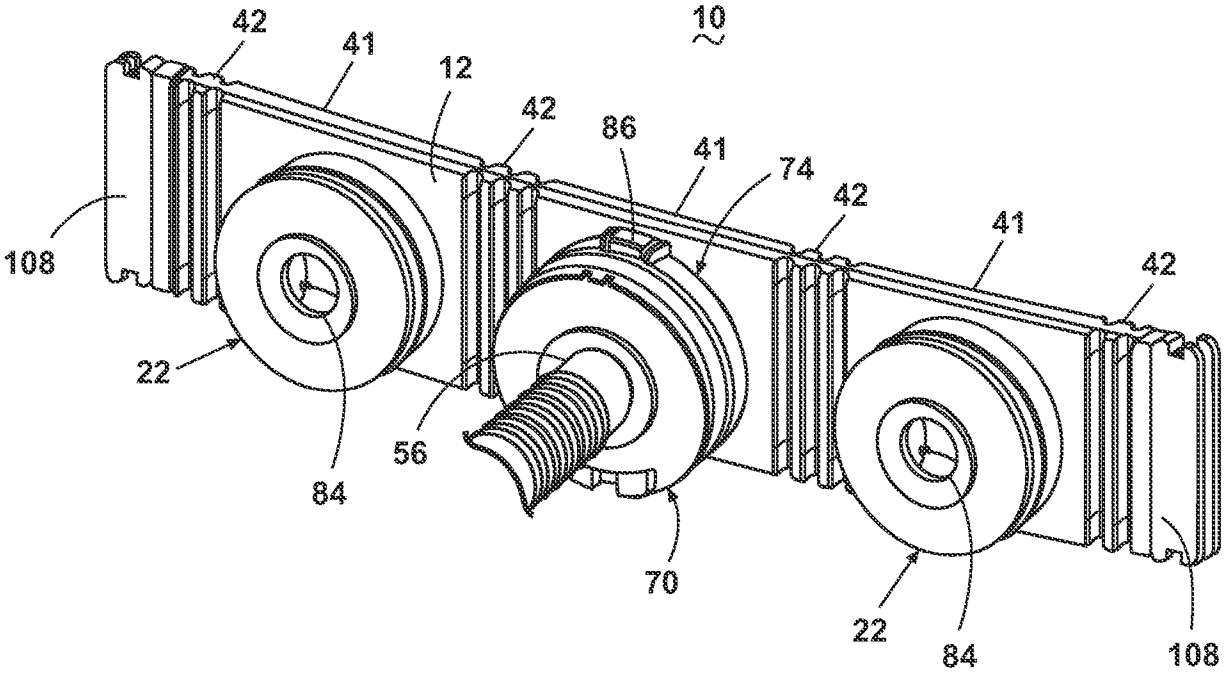
FIG. 10 is a perspective view of a PAPR belt according to a third embodiment of the invention.

Referring to FIG. 10, a third embodiment of the PAPR belt 10 according to the present invention is illustrated, where similar elements from the first embodiment are labeled with the same reference numerals. In this embodiment, the PAPR belt 10 includes the belt body 12, the spine 60 (FIGS. 6, 6A), two end caps 108, a threaded adapter 78 (FIG. 8), and is for use in conjunction with a self-contained PAPR module 70 as described above. The end caps 108 can be removably attached to the spine 60 (FIG. 6) in the same fashion as the battery housing 26 and the blower housing 24 of the first embodiment. In this third embodiment, no belt straps are provided, and the end caps 108 simply close off the open ends of the belt body 12.

Figure 11:
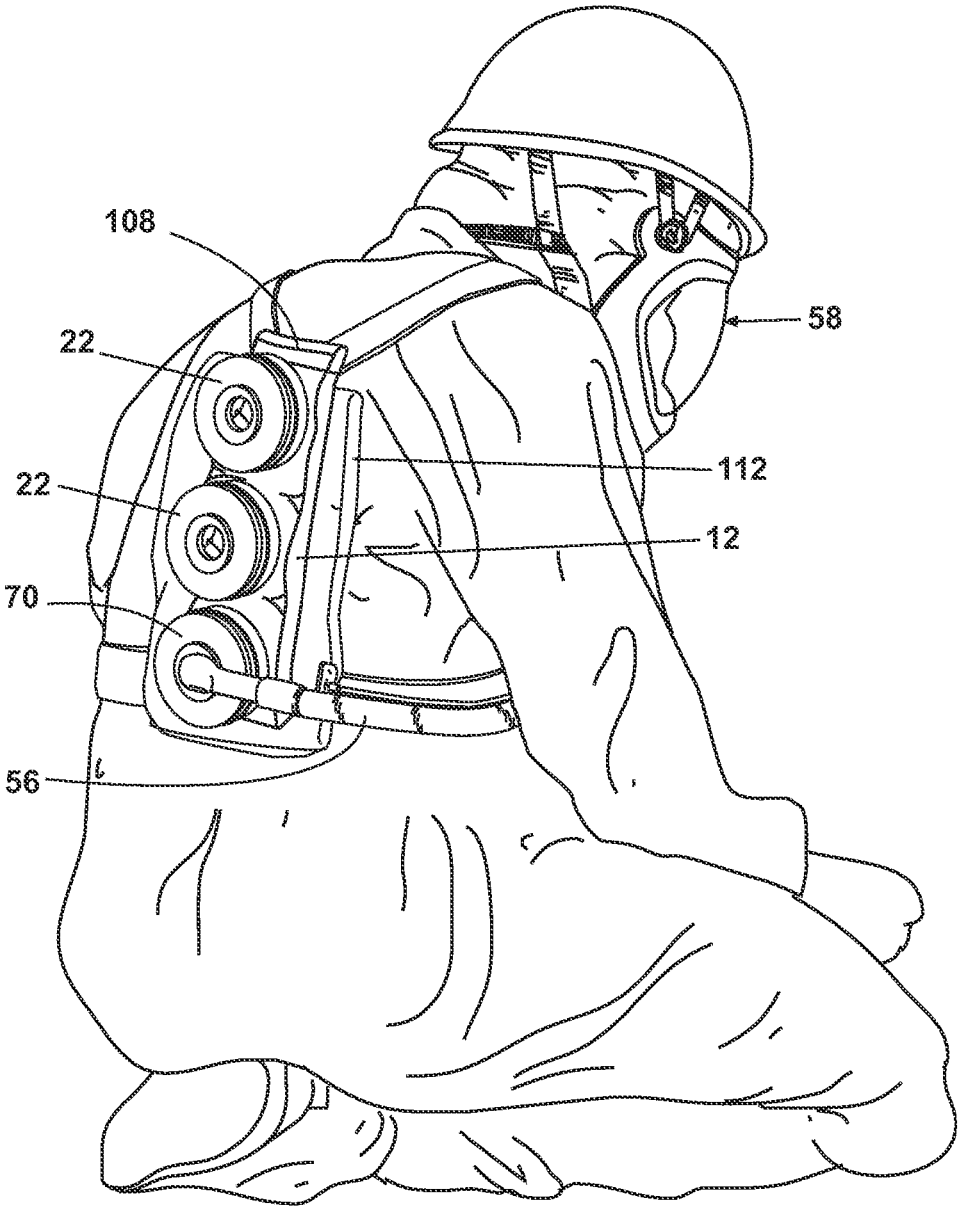
FIG. 11 is a perspective view of a PAPR belt of FIG. 10 and illustrating a backpack mounted user configuration.

In FIG. 11, the PAPR belt 10 of the third embodiment is shown coupled to air filters 22 and worn attached to a hydration pack backpack 112, or any other backpack, to be worn on the back of a user and for use with an air hose 56 between the PAPR belt 10 and a mask facepiece 58. The combination PAPR belt 10 and hydration pack backpack 112 provides the user with filtered air and hydration.

Figure 12:
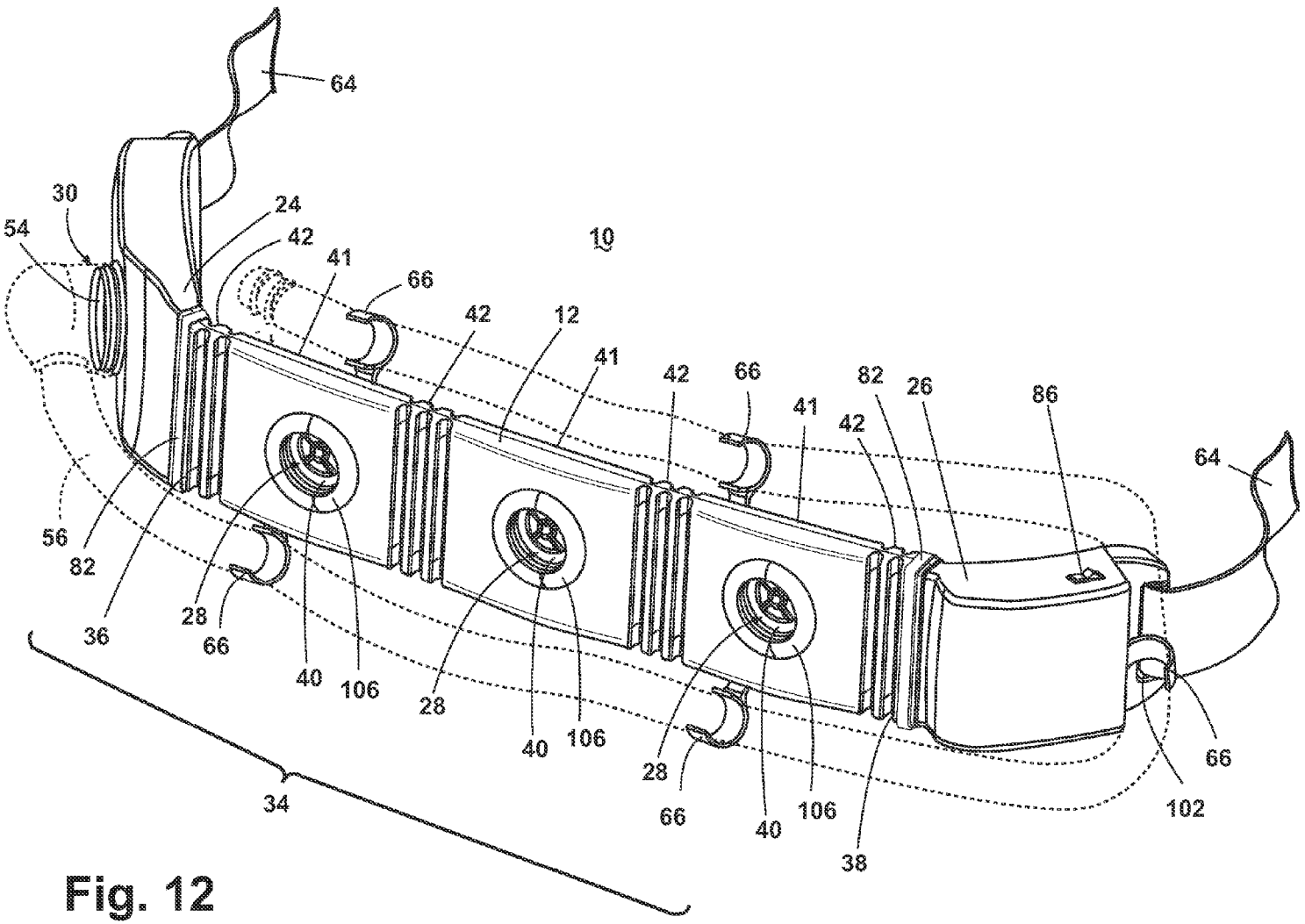
FIG. 12 is a perspective view of a PAPR belt according to a fourth embodiment of the invention and illustrating a hose management feature.

Referring to FIG. 12, a fourth embodiment of the PAPR belt 10 according to the present invention is illustrated, where similar elements from the first embodiment are labeled with the same reference numerals. In this embodiment, the PAPR belt 10 includes a hose management system. The hose management function is provided by hose retention elements, for example, clips 66, located around the periphery of the PAPR belt 10. The clips 66 can be attached to the belt body 12 by adhesive, screws, a form of welding, or any other suitable means. The clips 66 retain the hose 56 on the PAPR belt 10 and provide a compact means of storing the PAPR belt 10. In this fashion, the hose 56 can be retained to the PAPR belt 10 to provide a loop by which to hang up the PAPR belt 10 for decontamination or storage.

The respirator assembly according to the invention can take the form of a kit that includes a variety of modular components, with the belt body 12 forming the foundational element. The basic components of the respirator kit are the belt body 12; the spine 60; the motor 14 and fan 16 encased within the blower housing 24; a power source 20 encased in a battery housing 26; and a belt. In addition, the respirator kit can include a variety of filters to suit different conditions, end caps 68, an adaptor 78 and a PAPR module 70. There are many benefits to this respirator, including modular construction for easy configuration, decontamination, and repair. The user can easily clean or decontaminate the PAPR belt 10 by removing the key components, for example, the filters 22, battery housing 26, and blower housing 24, and submerging the entire center segment 34 of the belt body 12 in a cleaning solution. Further, because the PAPR belt 10 is made of a flexible rubber, it is also extremely durable and adjustable to fit the individual's body size and movement. It also offers a low profile design for restricted spaces and reduced snagging.

Another significant benefit of this respirator is the modular construction of the PAPR belt 10, which enables one to mix and match the components as required. With the battery housing 26 and blower housing 24 in place, any one or more of a variety of filters 22 can be selectively attached to the PAPR belt 10 to protect the user against particular conditions, such as particulate matter, harmful gases, vapors, or CBRN (chemical, biological, radiological, and nuclear) exposure. Alternatively, the blank end caps 68 can be attached to the belt body 12 and used in conjunction with a PAPR module 70 and filters 22, as selected by the user. The PAPR belt 10 can also be used by either right-handed or left-handed users. Further, the PAPR belt 10 can also be strapped to a SCBA tank or worn as a bandolier. Convention and conformal filters 22 can be mounted to the PAPR belt 10, and CBRN hazards can be protected against by utilizing CBRN rated filters 22. Thus, the respirator kit provides flexibility for protection in many different adverse conditions.

While the invention has been specifically described in connection with certain specific embodiments thereof, it is to be understood that this is by way of illustration and not of limitation. Reason variation and modification are possible within the scope of the forgoing disclosure and drawings without departing from the spirit of the invention as defined in the appended claims.

What is claimed is:

1. A powered air purifying respirator (PAPR) assembly comprising:

an elongated hollow belt body having open first and second ends and multiple inlet openings along a length of the elongated hollow belt body for mounting one or more filter canisters;

a filter canister mounted in at least one of the inlet openings, for supplying purified air to an interior of the elongated hollow belt body;

a motor and driven fan assembly having a fan inlet in communication with the or each filter canister through the elongated hollow belt body and a fan outlet; and a power source operably mounted to the elongated hollow belt body and connected to the motor and driven fan assembly.

2. The powered air purifying respirator assembly according to claim 1 and further comprising a blower housing removably attached through an open end of the blower housing to the open first end of the elongated hollow belt body and further having an outlet opening that is adapted to mount a hose for supplying filtered air to a user-wearable respiration protection device; and the motor and driven fan assembly is mounted within the blower housing, the fan inlet is in communication with the or each filter canister through the open end of the blower housing and the open first end of the elongated hollow belt body, and the fan outlet is in fluid communication with the blower housing outlet opening.

3. The powered air purifying respirator assembly according to claim 2 wherein the power source is mounted in a battery housing that is attached to the open second end of the elongated hollow belt body.

4. The powered air purifying respirator assembly according to claim 2 and further comprising a hose which is removably mounted to the blower housing outlet opening for supplying filtered air to the user-wearable respiration protection device.

5. The powered air purifying respirator assembly according to claim 4 wherein the hose has a swivel mounting through which it is mounted to the blower housing outlet opening, whereby the elongated hollow belt body can be worn in a right orientation or a left orientation by simply inverting the elongated hollow belt body from one orientation to the other.

6. The powered air purifying respirator assembly according to claim 3 and further comprising a belt that is adapted to be mounted to the blower housing and to the battery housing to mount an assembled belt body, blower housing and battery housing to a user.

7. The powered air purifying respirator assembly according to claim 1 and further comprising a self-contained powered air purifying respirator module that includes the motor and driven fan assembly and the power source, and the module is mounted in one of the inlet openings, the module having an inlet opening in communication with the or each filter canister through the elongated hollow belt body, and an outlet opening for supplying filtered air to a user-wearable respiration protection device.

8. The powered air purifying respirator assembly according to claim 7 and further comprising a pair of end caps that are adapted to be attached to the open first and second ends of the elongated hollow belt body to seal the same.

9. The powered air purifying respirator assembly according to claim 7 and further comprising a hose which is mounted to the module outlet opening for supplying filtered air to the user-wearable respiration protection device.

10. The powered air purifying respirator assembly according to claim 1 wherein the motor and driven fan assembly is removably mounted to the elongated hollow belt body.

11. The powered air purifying respirator assembly according to claim 1 wherein the power source is removably mounted to the elongated hollow belt body.

12. The powered air purifying respirator assembly according claim 1 wherein the or each filter canister is removably mounted to the elongated hollow belt body.

13. The powered air purifying respirator assembly according to claim 1 and further comprising a relatively rigid spine mounted within the elongated hollow belt body and that extends along the length of the elongated hollow belt body, and the spine has connectors at each end to connect the elongated hollow belt body to components that are mounted to the open first and second ends of the elongated hollow belt body, wherein the spine resists stretching of the elongated hollow belt body.

14. The powered air purifying respirator assembly according to claim 13 wherein the spine has a plurality of spaced fingers along a length thereof and the spaced fingers are configured to resist collapse of the elongated hollow belt body due to transverse compression thereof.

15. A powered air purifying respirator assembly according to claim 13 wherein the spine connectors include a hook formed into each end of the spine and a pin that extends through each hook.

16. The powered air purifying respirator assembly according to claim 1 wherein the elongated hollow belt body is formed of a flexible elastomeric material and is resiliently bendable to conform to a user's body.

17. The powered air purifying respirator assembly according to claim 1 wherein the elongated hollow belt body is formed with flat sections that are bounded by corrugated sections.

18. The powered air purifying respirator assembly according to claim 17 wherein the at least one of the inlet openings is formed in each flat section.

19. The powered air purifying respirator assembly according to claim 18 wherein each of the inlet openings is formed with connectors that are adapted for mounting filter canisters.

20. The powered air purifying respirator assembly or kit according to claim 19 wherein the connectors in the inlet openings are threaded or bayonet connections.

21. The powered air purifying respirator assembly according to claim 1 wherein there are three inlet openings spaced along the length of the elongated hollow belt body.

22. The powered air purifying respirator assembly according to claim 1 wherein the power source comprises multiple rechargeable batteries.

23. The powered air purifying respirator assembly according to claim 1 and further comprising a plurality of hose retention elements mounted to the elongated hollow belt body for releasably mounting a respirator hose to the elongated hollow belt body.

24. A powered air purifying respirator kit comprising:

an elongated hollow belt body having open first and second ends and multiple inlet openings along a length of the elongated hollow belt body for mounting filter canisters;

at least one filter canister adapted to be mounted in at least one of the inlet openings, for supplying purified air to an interior of the elongated hollow belt body; and one or more of the following components for mounting to the elongated hollow belt body:

a. a blower housing that is adapted to be removably attached through an open end to the open first end of the elongated hollow belt body and further having an outlet opening that is adapted to mount a hose for supplying filtered air to a user-wearable respiration protection device; and a motor and driven fan assembly is mounted within the blower housing, a fan inlet is in communication with the open end of the blower housing, and a fan outlet is in fluid communication with the blower housing outlet opening; and a power source adapted to be operably mounted to the elongated hollow belt body and connected to the motor and driven fan assembly;

b. a hose which is adapted to be removably mounted to a blower housing outlet opening for supplying filtered air to a user-wearable respiration protection device;

c. a belt that is adapted to be mounted to a blower housing and to a battery housing to mount an assembled belt body, blower housing and battery housing to a user;

d. a motor and driven fan assembly adapted to be mounted to the elongated hollow belt body and having a fan inlet, which is adapted to be in communication with at least one of the multiple inlet openings through the elongated hollow belt body when mounted to the elongated hollow belt body, and a fan outlet;

e. a power source adapted to be operably mounted to the elongated hollow belt body and connected to a motor and driven fan assembly;

f. a self-contained powered air purifying respirator module that includes a motor and driven fan assembly and a power source, and the module is adapted to be mounted in one of the inlet openings wherein the fan inlet opening is in communication with the at least one filter canister that is mounted in other inlet openings in the elongated hollow belt body and the module has an outlet opening for supplying purified air to a user;

g. a pair of end caps that are adapted to be attached to the open first and second ends of the elongated hollow belt body to seal the same;

h. a hose that is adapted to be mounted to a powered air purifying respirator module outlet opening for supplying filtered air to a user-wearable respiration protection device;

i. a hose that is adapted to be mounted to a powered air purifying respirator module outlet opening for supplying filtered air to a user-wearable respiration protection device and that has a swivel mounting through which it is adapted to be mounted to a blower housing outlet opening, whereby the elongated hollow belt body can be worn in a right orientation or a left orientation by simply inverting the elongated hollow belt body from one orientation to the other;

j. a power source that comprises multiple rechargeable batteries and that can be removably mounted to the elongated hollow belt body;

k. a plurality of hose retention elements that can be mounted to the elongated hollow belt body for releasably mounting a respirator hose to the elongated hollow belt body;

l. a variety of filter canisters that comprise the at least one filter canister with filter media to suit different conditions, including particulate matter, harmful gases, vapors, or CBRN (chemical, biological, radiological, and nuclear) exposure;

m. a belt that is adapted to be mounted to a blower housing and to a battery housing to mount an assembled hollow elongated belt body, blower housing and battery housing to a user; and n. a controller that can be electrically connected to a motor and a power source for controlling the power to the motor to maintain a constant flow of purified air from a fan outlet.

25. The powered air purifying respirator kit according to claim 24 and further comprising a relatively rigid spine mounted within the elongated hollow belt body and that extends along a length of the elongated hollow belt body, and the spine has connectors at each end that are adapted to connect the elongated hollow belt body to components that are mounted to the open first and second ends of the elongated hollow belt body wherein the spine resists stretching of the elongated hollow belt body.

26. The powered air purifying respirator kit according to claim 24 wherein the elongated hollow belt body is formed of a flexible elastomeric material and is resiliently bendable to conform to a user's body.

27. The powered air purifying respirator kit according to claim 24 wherein the elongated hollow belt body is formed with flat sections that are bounded by corrugated sections.

28. The powered air purifying respirator kit according to claim 27 wherein each of the inlet openings is formed in each flat section.

29. The powered air purifying respirator kit according to claim 28 wherein each of the inlet openings is formed with connectors that are adapted for mounting filter canisters.

*30. A powered air purifying respirator assembly comprising:*

*an elongated hollow body having multiple openings along a length of the elongated hollow body between the ends thereof;*

*a filter canister mounted in at least one of the openings for supplying purified air to an interior of the elongated hollow body; and*

*a self-contained PAPR mounted in one of the openings and having a motor and driven fan assembly with a fan inlet in communication with the or each filter canister*

*through the elongated hollow body and a fan outlet, and a power source operably connected to the motor and driven fan assembly to draw filtered air from the interior of the elongated hollow body to the fan outlet.*

*31. The powered air purifying respirator according to claim 30 mounted to a back pack.*

*32. The powered air purifying respirator according to claim 30 further comprising a hose which is removably mounted to the fan outlet for supplying filtered air to a user-wearable respiration protection device.*

*33. The powered air purifying respirator according to claim 30 wherein the elongated hollow body is closed at the ends thereof.*

*34. The powered air purifying respirator according to claim 30 wherein the power source comprises at least one battery.*

* * * * *